US011451374B2

(12) United States Patent
Krishna et al.

(10) Patent No.: US 11,451,374 B2
(45) Date of Patent: Sep. 20, 2022

(54) AUTOMATIC PASSWORD ROLLOVER

(71) Applicant: MICRO FOCUS LLC, Santa Clara, CA (US)

(72) Inventors: Vamsi Krishna, Bangalore (IN); Harinath Jarugula, Bangalore (IN); Keshavan Santhanam, Bangalore (IN)

(73) Assignee: MICRO FOCUS LLC, Santa Clara, CA (US)

(*) Notice: Subject to any disclaimer, the term of this patent is extended or adjusted under 35 U.S.C. 154(b) by 0 days.

(21) Appl. No.: 17/183,973

(22) Filed: Feb. 24, 2021

(65) Prior Publication Data
US 2022/0271917 A1    Aug. 25, 2022

(51) Int. Cl.
*H04L 29/06* (2006.01)
*H04L 9/06* (2006.01)
*H04L 9/08* (2006.01)

(52) U.S. Cl.
CPC .......... *H04L 9/0643* (2013.01); *H04L 9/0841* (2013.01); *H04L 9/0863* (2013.01)

(58) Field of Classification Search
None
See application file for complete search history.

(56) References Cited

U.S. PATENT DOCUMENTS

| 5,719,941 | A  | * | 2/1998  | Swift ..................... G06F 21/31 705/72 |
| 6,826,686 | B1 | * | 11/2004 | Peyravian ............. H04L 9/3236 713/168 |
| 7,434,050 | B2 | * | 10/2008 | Jeffries ................. H04L 9/3228 713/169 |
| 9,912,476 | B2 | * | 3/2018  | Brouwer ............... H04L 9/0894 |
| 10,742,634 | B1 | * | 8/2020  | Shahbazi ............. H04W 12/77 |
| 10,873,572 | B1 | * | 12/2020 | Krishna ................ H04L 67/141 |
| 2008/0229105 | A1 | * | 9/2008  | Jeffries ................. H04L 9/3228 713/169 |
| 2013/0166918 | A1 | * | 6/2013  | Shahbazi ............. H04L 9/0863 713/183 |
| 2019/0319781 | A1 | * | 10/2019 | Chhabra ............... G06F 3/0673 |

* cited by examiner

Primary Examiner — Jeffery L Williams
(74) Attorney, Agent, or Firm — Sheridan Ross P.C.

(57) ABSTRACT

A first device nonce and a first Hash based Message Authentication Code (HMAC) of the first device nonce using an old password as a key is received. The received first HMAC is compared to a computed second HMAC of the received first device nonce using a stored old password as the key for a match. In response to the match, a third HMAC of a second device nonce using the stored old password as the key is computed. A change password acknowledgement message is sent to the first device that comprises the second device nonce and the third HMAC. A final secret is computed using a second device secret and the first device nonce. A new password using a key derivation function that uses the old password and the final secret is computed. Thus, a new password is generated without sending the password over a network.

20 Claims, 2 Drawing Sheets

AUTOMATIC PASSWORD ROLLOVER

FIELD

The disclosure relates generally to password rollover processes and particularly to password rollover processes on an unsecure network.

BACKGROUND

Today's networks may comprise many types of devices, such as, Personal Computers (PCs), laptop devices, notepads, smartphones, sensors, appliances, alarm systems, home control systems, remote cameras, fire alarms, heating systems, access terminals, and/or the like. Many of these devices may not have an associated user or even a user interface. Even if there is an associated user, the user may be away when the device password needs to be changed. In addition, some or all the network may be unsecure. For example, a proxy may be used that results in part of the network path being unsecure. Because of these issues, traditional user passwords schemes that use a secure communication channel, in many cases will not work.

SUMMARY

These and other needs are addressed by the various embodiments and configurations of the present disclosure. A first device nonce and a first Hash based Message Authentication Code (HMAC) of the first device nonce using an old password as a key is received. The received first HMAC is compared to a computed second HMAC of the received first device nonce using a stored old password as the key for a match. In response to the match, a third HMAC of a second device nonce using the stored old password as the key is computed. A change password acknowledgement message is sent to the first device that comprises the second device nonce and the third HMAC. A final secret is computed using a second device secret and the first device nonce. A new password using a key derivation function that uses the old password and the final secret is computed. The end result is that a new password is derived on the first device and second device without actually sending the new password over the network.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
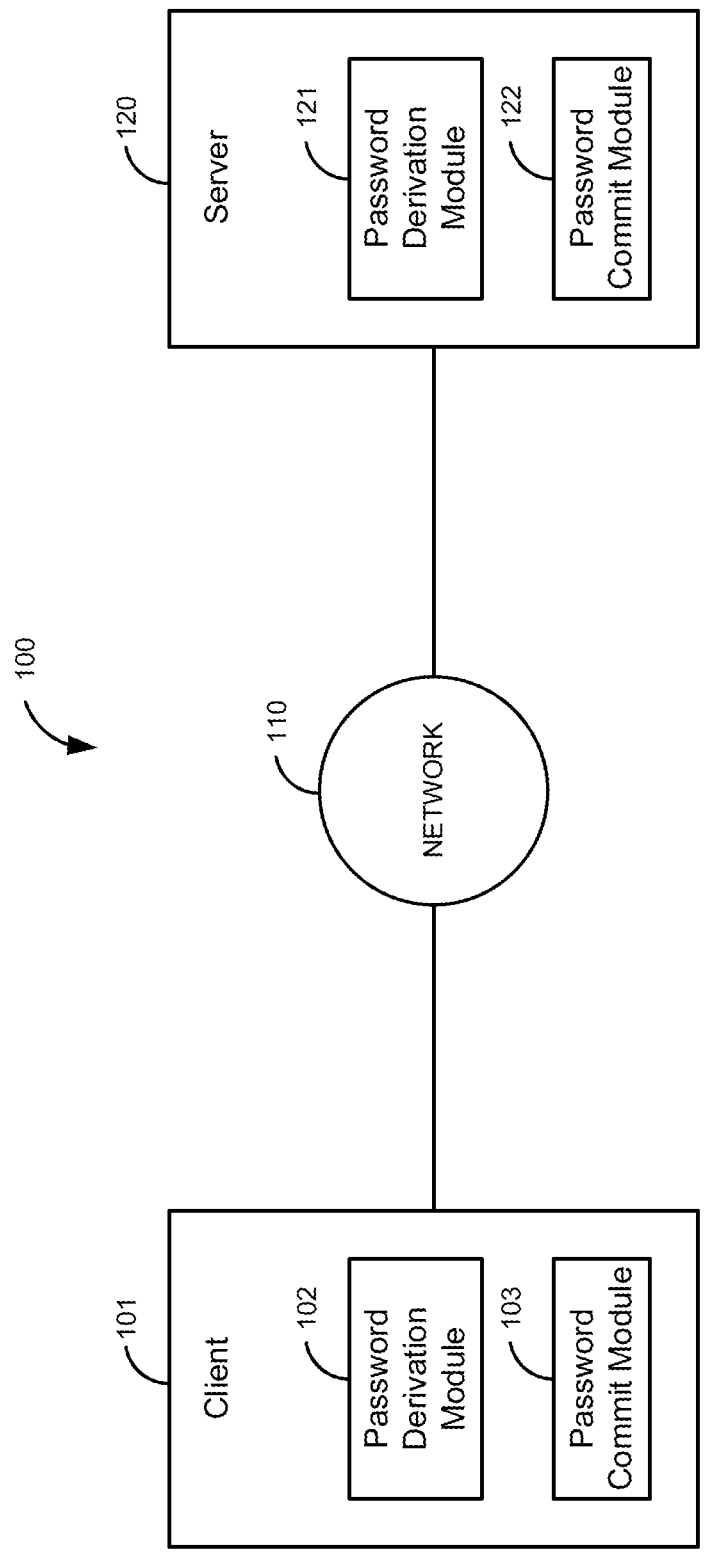
FIG. 1 is a block diagram of a first illustrative system for automatically rolling over a password.

FIG. 1 is a block diagram of a first illustrative system 100 for automatically rolling over a password. The first illustrative system 100 comprises a client 101, a network 110, and a server 120. The client 101 may be any type of communication device that can communicate on the network 110, such as a Personal Computer (PC), a telephone, a video system, a cellular telephone, a Personal Digital Assistant (PDA), a tablet device, a notebook device, a smart phone, a router, a gateway, a sensor, an appliance, a camera, a server 120, a security system, an Internet of Things (IoT) device, and/or the like. Although not shown in FIG. 1, any number of clients 101 may be connected to the network 110. For example, the server 120 may support any number of clients 101.

The client 101 comprises a password derivation module 102 and a password commit module 103. The password derivation module 102 can be, or may include, any hardware/software that can derive a new password. The password commit module 103 can be, or may include, any hardware/software that is used to confirm that both the client 101 and the server 120 have switched to a new password.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Hyper Text Transport Protocol, Bluetooth, WiFi, and/or the like. Thus, the network 110 is an electronic communication network configured to carry messages via packets and/or circuit switched communications.

The server 120 can be any type of server or system that uses a password to communicate with the client 101, such as a device management system (e.g., Micro Focus' ZENworks™), a network management system, a control system, an authentication server, and/or the like. The server 120 comprises a password derivation module 121 and a password commit module 122. The password derivation module 121 may be the same or similar to the password derivation module 102. The password derivation module 121 works in conjunction with the password derivation module 102 for concurrently generating a new password.

The password commit module 122 may be the same or similar to the password commit module 103. The password commit module 122 works in conjunction with the password commit module 103 to confirm a switchover to a new password.

Figure 2:
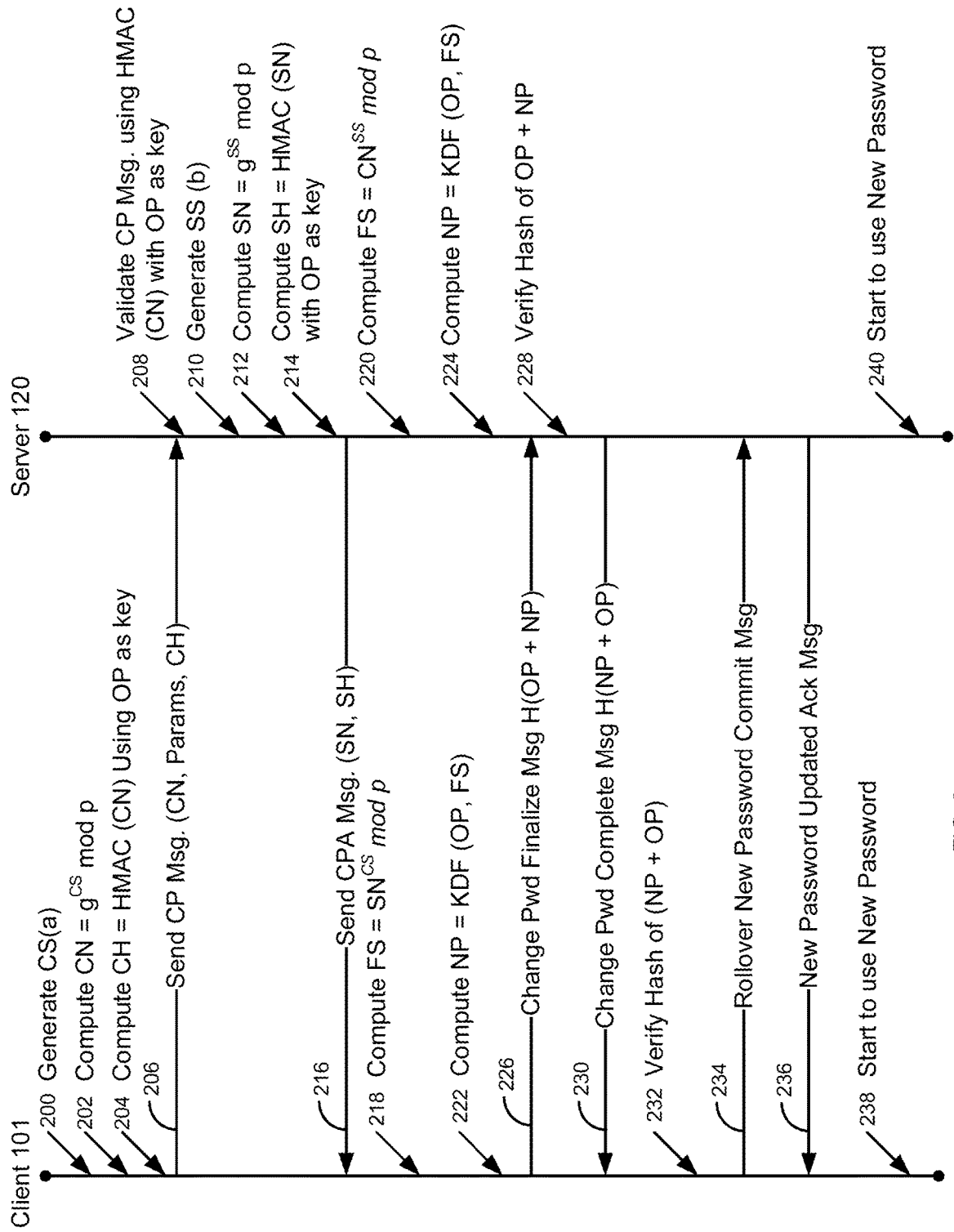
FIG. 2 is a flow diagram of a process for automatically rolling over a password.

FIG. 2 is a flow diagram of a process for automatically rolling over a password. Illustratively, the client 101, the password derivation module 102, the password commit module 103, the server 120, the password derivation module 121, and the password commit module 122 are stored-program-controlled entities, such as a computer or microprocessor, which performs the method of FIG. 2 and the processes described herein by executing program instructions stored in a computer readable storage medium, such as a memory (i.e., a computer memory, a hard disk, and/or the like). Although the methods described in FIG. 2 are shown in a specific order, one of skill in the art would recognize that the steps in FIG. 2 may be implemented in different orders and/or be implemented in a multi-threaded environment. Moreover, various steps may be omitted or added based on implementation.

The process of FIG. 2 is described using the client 101/server 120 model of FIG. 1. However, the process of FIG. 2 may work between any type of devices. For example, the process of FIG. 2 may work between two servers 120, between two clients 101, between a sensor and a server 120, and/or the like. In addition, the roles of the client 101 and the server 120 may be reversed. For example, the process of FIG. 2 (e.g., step 200) may begin at the server 120 instead of the client 101.

To begin, below is a list of definitions that are used in discussing the process for rolling over a password as shown in FIG. 2.

(CS)=A secret generated by the client 101

(CN)=Client Nonce—a nonce that is computed by the client 101 using CS and Diffie-Hellman key exchange.

(CH)=a Hash based Message Authentication Code (HMAC) of the Client Nonce with an old password as the key.

(CPA)=Changed Password Acknowledge message—Message that acknowledges a change password message.

(CP)=Change Password message—Message that initiates the change password process.

(CPF)=Change Password Finalize message—Message that contains a hash of the old password+the new password.

(CPC)=Change Password Complete message—Message that contains a hash of the new password+the old password.

(FS)=Final Secret—Is a final secret that both the client 101 and the server derive when computing a new password.

(H)=Hash (HMAC)=Hash based Message Authentication Code (e.g., see https://www.geeksforgeeks.org/hmac-algorithm-in-computer-network/), which is incorporated herein by reference.

(KDF)=Key Derivation Function (e.g., see https://en.wikipedia.org/wiki/Key_derivation_function#:~:text=In%20crytograp
h%2C%20a%20key%20derivation,
passphrase%20using%20a%20pseudorando
m%20function),which is incorporated herein by reference.

(NP)=New Password (NPUA) New Password Updated Acknowledge message (OP)=Old Password (Params)=these may include Diffie-Hellman parameters, such as, g (generator) and p (a large prime number), hash mechanisms, password characteristics to KDF, etc.)

(RNPC) Rollover New Password Commit message (SH)=HMAC of the Server Nonce using the old password as key SS=Server Secret—A secrete that is generated by the server (SN)=Server Nonce—A nonce that is computed by the server 120 using SS The process of FIG. 2 assumes that both the client 101 and the server 120 initially possess a common password that is designed as the old password (OP) described below. The old password may be in various formats, such as, a text string (e.g., a user password), a number, an integer, and/or the like. The old password may be a user defined password, a machine generated password, and/or the like. The old password may be different sizes based on implementation.

The process starts in step 200 when the password derivation module 102 generates the client secret (CS). The client secret can be generated in various ways. For example, the password derivation module 102 may use a random number generator to generate the client secret. The size of the client secret may also vary based on implementation. Using the client secret, the password derivation module 102 computes the client nonce (CN) based on the Diffie Hellman key exchange algorithm (see https://en.wikipedia.org/wiki/Diffie%E2%80%93Hellman_key_exchange, which is incorporated herein by reference) in step 202. The password derivation module 120 computes the client nonce using the equation $g^{CS}$ mod p, where g is the generator (typically 2) and p is a large prime number (Diffie-Hellman parameters).

To further illustrate the generation of the client nonce (steps 200/202), consider the following simplified example. Assume the parameters as shown below.

g=2 (generator 2)
p=1723 (prime number)
a (CS)=20

In step 200, the client secret generated by the random number generator is 20. In step 202, the $CN=2^{20}$ mod 1723=496.

The password derivation module 102 also computes, in step 204, the CH, which is a Hash based Message Authentication Code (HMAC) of the client nonce using the old password as the key. The password derivation module 102, sends, in step 206, a change password (CP) message that includes the client nonce, Diffie-Hellman params, and the CH of the client nonce using the old password as the key. The Diffie-Hellman parameters may include parameters, such as, g (generator) and p (a large prime number), hash mechanisms, password characteristics to KDF, etc.

The CP message of step 206 may be sent based on an event. The event may be any event where it is determined that a new password needs to be exchanged, such as, a time period, an administered value, a detected security breach, and/or the like. The server 120 receives the change password message of step 206.

The password derivation module 121, in step 208, validates the change password message by repeating the same process of the password derivation module 102. This is accomplished by the password derivation module 121 calculating a second CH by doing a HMAC of the client nonce (received in the CP message) using the old password (that was previously stored by the server 120) as the key. If the received CH matches the calculated second CH in step 208, the password derivation module 121 has validated that the client 101 knows the old password. If the two CHs don't match, the process ends because the received CH was not calculated using the old password and the password ownership is not proved.

Otherwise, if the two CHs match in step 208, the password derivation module 121, in step 210, generates the server secret (SS). The server secret is typically generated in the same manner as the client secret (e.g., using a random number generator). The password derivation module 121 computes the server nonce (SN) in step 212 by the Diffie-Hellman key exchange algorithm $g^{server\ secret}$ mod p. Like the client nonce, the size of the server nonce may vary based on implementation.

To further illustrate steps 210/212, taking the parameters described above for steps 202/204 where g is 2 and p is 1723. In step 210, the server secret is generated by the random number generator to be 31. In step 212, the $SN=2^{31}$ mod 1723=961. Note that in reality, the value p will be very large and the values of the client secret/server secret will much larger so that the process is secure.

The password derivation module 121 computes, in step 214, the SH, which is a HMAC of the server nonce that uses the old password as a key. The password derivation module 121, in step 216, sends a change password acknowledgement (CPA). The CPA message of step 216 comprises the server nonce and the SH of the server nonce using the old password as the key. Although steps 210 and 212 are described occurring after step 208, steps 210 and 212 may occur before step 208 or even before step 200.

In response to receiving the change password acknowledgement message of step 216, the password derivation module 102, computes, in step 218, a final secret (FS) using the client secret and server nonce. The FS of step 218 is calculated as $FS=(SN^a$ mod p where a is the client secret generated in step 200. The password derivation module 121 computes, in step 220, the final secret as $FS=(CN^b$ mod p where b is the server secret generated in step 210. While the process described above uses Diffie-Hellman key exchange, the process may use other Diffie-Hellman variants, such as Elliptic Curve Diffie-Hellman, and/or the like.

To further illustrate the computing of the final secret using the parameters in the above example, the calculation for the FS by the client 101, in step 218, is $FS=961^{20}$ mod 1723=1400. Likewise, the server 120 calculates FS the in step 220 as $FS=496^{31}$ mod 1723=1400.

The password derivation module 102, computes the new password using a key derivation function (KDF) using the old password and the final secret in step 222. Likewise, the password derivation module 121, computes the new password using the key derivation function using the old password and the final secret in step 224. At this point in time, both the client 101 and the server 120 now have derived the new password.

The process then uses a two-phase commit protocol (typically used for database transactions) to commit the password (see https://en.wikipedia.org/wiki/Two-phase_commit_protocol, which is incorporated herein by reference). What is novel here is that the two-phase commit protocol is being used to verify the commitment to new password, which is currently not known in the art. In addition, the two-phase commit protocol used here uses different parameters to verify the commitment to a new password from what is known in the art.

The password commit module 103 sends a change password finalize (CPF) message in step 226. The CPF message contains a hash of the old password+the new password. The password commit module 122, in step 228, verifies the hash of the old password+new password to confirm that the client 101 that sent the CPF message of step 226 has both the old password/new password. The password commit module 122 sends, in step 230, a change password complete (CPC) message. The CPC message of step 230 contains a hash of the new password+the old password. In this example, the hash of the CPC message (the new password+the old password) are reversed from the CPF message of step 226. The password commit module 103 verifies the hash of the new password+the old password in step 232 to confirm that the server 120 is ready to change to the new password. In another embodiment, the orders of the old password/new password for steps 218/222 may be reversed. In addition, other variations may be used.

The password commit module 103, in step 234, sends a rollover new password commit (RNPC) message to the password commit module 122. In response the password commit module 122 sends, in step 236, a new password updated acknowledge (NPUA) message. The password commit module 103 receives the NPUA message of step 236. Since the client 101 has now confirmed that the server 120 is ready to use the new password, the client 101 starts using the new password in step 238. Likewise, since the server 120 has also confirmed that the client 101 is ready to use the new password, the server 120 starts using the new password in step 240.

If any of the messages of steps 226, 230, 234, and 236 are not received, the process starts over at step 226 until successful. If not, the changeover to the new password in not initiated as described in the two-phase commit reference.

Because of the complexities in the calculations for generating the new passwords by using large numbers for the client secret, server secret, and p, the ability to determine the password becomes extremely difficult even using advanced computing techniques. This is what makes the above processes secure. The above described processes clearly could not be realistically be accomplished using a manual process.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer readable medium, coupled with the microprocessor and comprising microprocessor readable and executable instructions that, when executed by the microprocessor, cause the microprocessor to:
    receive, from a first device, at a second device, a first device nonce and a first Hash based Message Authentication Code (HMAC) of the first device nonce using an old password as a key;
    compare the received first HMAC to a computed second HMAC of the received first device nonce using a stored old password as the key for a match;
    in response to the match, compute a third HMAC of a second device nonce using the stored old password as the key;
    send a change password acknowledgement message to the first device that comprises the second device nonce and the third HMAC;
    compute a final secret using a second device secret and the first device nonce; and
    compute a new password using a key derivation function that uses the old password and the final secret.

2. The system of claim 1, wherein the microprocessor readable and executable instructions further cause the microprocessor to:
    generate the second device secret;
    compute the second device nonce, wherein the second device nonce is computed using $g^{second\ device\ secret}$ mod and wherein the final secret is computed using (first device nonce)$^{second\ device\ secret}$ mod p.

3. The system of claim 1, wherein the microprocessor readable and executable instructions further cause the microprocessor to:
    receive, from the first device, a change password finalize message that contains a hash of the old password and the new password;
    verify the hash of the old password and the new password;
    in response to verifying the hash of the old password and the new password, send a change password complete message that has a hash of the new password and the stored old password;
    receive a rollover new password commit message; and
    send a new password updated acknowledgement message.

4. The system of claim 3, wherein an order of the hash of the old password and the new password of the received change password finalize message and an order of the new password and the stored old password of the change password complete message are reversed.

5. The system of claim 3, wherein the microprocessor readable and executable instructions further cause the microprocessor to:
start using the new password.

6. The system of claim 1, wherein the received first HMAC is sent based on at least one of: an event, a time period, a detected security breach, and an administered value.

7. The system of claim 1, wherein receiving the first device nonce and the first Hash based Message Authentication Code (HMAC) further comprises receiving one or more Diffie-Hellman key exchange parameters.

8. A method comprising:
receiving, by a microprocessor, a first device nonce and a first Hash based Message Authentication Code (HMAC) of the first device nonce using an old password as a key;
comparing, by the microprocessor, the received first HMAC to a computed second HMAC of the received first device nonce using a stored old password as the key for a match;
in response to the match, computing, by the microprocessor, a third HMAC of a second device nonce using the stored old password as the key;
sending, by the microprocessor, a change password acknowledgement message that comprises the second device nonce and the third HMAC;
computing, by the microprocessor, a final secret using a second device secret and the first device nonce; and
computing, by the microprocessor, a new password using a key derivation function that uses the old password and the final secret.

9. The method of claim 8, further comprising:
generating the second device secret;
computing the second device nonce, wherein the second device nonce is computed using $g^{second\ device\ secret}$ mod p, and wherein the final secret is computed using (first device nonce)$^{second\ device\ secret}$ mod p.

10. The method of claim 8, further comprising:
receiving a change password finalize message that contains a hash of the old password and the new password;
verifying the hash of the old password and the new password;
in response to verifying the hash of the old password and the new password, sending a change password complete message that has a hash of the new password and the stored old password;
receiving a rollover new password commit message; and
sending a new password updated acknowledgement message.

11. The method of claim 10, wherein an order of the hash of the old password and the new password of the received change password finalize message and an order of the new password and the stored old password of the change password complete message are reversed.

12. The method of claim 10, further comprising, using the new password.

13. The method of claim 8, wherein the received first HMAC is sent based on at least one of: an event, a time period, a detected security breach, and an administered value.

14. The method of claim 8, wherein receiving the first device nonce and the first Hash based Message Authentication Code (HMAC) further comprises receiving one or more Diffie-Hellman key exchange parameters.

15. A system comprising:
a microprocessor; and
a computer readable medium, coupled with the microprocessor and comprising microprocessor readable and executable instructions that, when executed by the microprocessor, cause the microprocessor to:
compute a first Hash based Message Authentication Code (HMAC) using a first device nonce with a stored old password as a key;
send, from a first device, to a second device, the first device nonce and the first HMAC of the first device nonce with the stored old password as the key;
receive a change password acknowledgment message from the second device that comprises a second device nonce and a second HMAC of a second device nonce using an old password as the key;
compute a final secret using a first device secret and the second device nonce; and
compute a new password using a key derivation function that uses the old password and the final secret.

16. The system of claim 15, wherein the microprocessor readable and executable instructions further cause the microprocessor to:
generate the first device secret;
compute the first device nonce, wherein the first device nonce is computed using $g^{first\ device\ secret}$ mod p, and wherein the final secret is computed using (second device nonce)$^{first\ device\ secret}$ mod p.

17. The system of claim 15, wherein the microprocessor readable and executable instructions further cause the microprocessor to:
send, from the first device, a change password finalize message that contains a hash of the old password and the new password;
receive a change password complete message that has a hash of the new password and the old password;
verify the hash of the old password and the new password;
send a rollover new password commit message; and
receive a new password updated acknowledgement message.

18. The system of claim 17, wherein an order of the hash of the old password and the new password of the sent change password finalize message and an order of the new password and the stored old password of the change password complete message are reversed.

19. The system of claim 17, wherein the microprocessor readable and executable instructions further cause the microprocessor to:
start using the new password.

20. The system of claim 15, wherein the first sent HMAC is sent based on at least one of: an event, a time period, a detected security breach, and an administered value.

* * * * *